Jan. 29, 1963    M. LOOMIS    3,075,213
LOADING RAMP CONSTRUCTION
Filed June 2, 1958    2 Sheets-Sheet 1

INVENTOR.
MARTIN LOOMIS
BY
Learman, Learman & McCulloch

Jan. 29, 1963 M. LOOMIS 3,075,213
LOADING RAMP CONSTRUCTION
Filed June 2, 1958 2 Sheets-Sheet 2

INVENTOR.
MARTIN LOOMIS

United States Patent Office 3,075,213
Patented Jan. 29, 1963

3,075,213
LOADING RAMP CONSTRUCTION
Martin Loomis, 133 E. 4th St., Clare, Mich.
Filed June 2, 1958, Ser. No. 739,172
6 Claims. (Cl. 14—71)

This invention relates to loading ramp constructions of the kind including a loading ramp normally supported in horizontal position, but which is operable automatically upon the approach of a vehicle to be loaded or unloaded to be swung upwardly out of the path of the vehicle and then relocated automatically at substantially the level of the load carrying bed of the vehicle. More particularly, the invention pertains to apparatus for use with such loading ramps for locking or disabling the ramp from such swinging movements.

Loading ramps of the kind with which the invention is concerned frequently are installed at the loading docks of warehouses, factories, and like buildings to facilitate the loading or unloading of vehicles at the dock. In many instances the building is provided with door openings into which the loading ramp leads and not infrequently the door openings are provided with doors which, when closed, are located directly above the loading ramp. As long as the loading ramp is at its normal or inactive, substantially horizontal position, no difficulty arises when the door is closed, nor is any difficulty encountered as long as the door is open. Frequently, however, a truck or the like to be loaded or unloaded will arrive at the loading dock prior to the time the door is opened and, unless the truck driver exercises caution, it is possible that the loading ramp could be swung upwardly against the door and cause damage either to the door, the loading ramp, or both.

An object of this invention is to provide a loading ramp construction having an automatically operable loading ramp of the kind referred to and in which means is provided for disabling the ramp from operation in those instances where operation of the ramp would be likely to cause damage.

Another object of the invention is to provide means for disabling operation of an automatically operable loading ramp and which are automatically located in disabling position when operation of the ramp could cause damage A further object of the invention is to provide means for disabling operation of a ramp member and which are self-cleaning.

A still further object of the invention is to provide disabling means of the kind described which are simple in construction, economical to manufacture, and durable in use.

Other objects and advantages of the invention will be pointed out specifically or will become apparent from the following description when it is read in conjunction with the appended claims and the accompanying drawings, in which:

Figure 1:
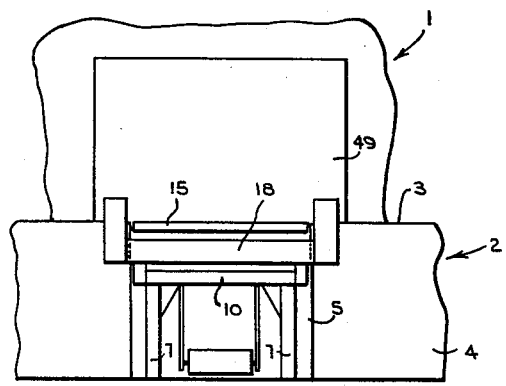
FIGURE 1 is a fragmentary front elevational view of a loading dock and warehouse equipped with a loading ramp constructed in accordance with the principles of the invention.

Apparatus constructed in accordance with the invention is adapted for use with automatically operable loading ramp constructions of the kind described in either of the pending applications of Martin Loomis et al., Serial No. 575,012, filed March 30, 1956, now Patent No. 2,994,894 or Thomas H. McConica, Serial No. 734,352 filed May 9, 1958, now Patent No. 2,972,762 or any equivalent construction, but for purposes of illustration the apparatus shown herein is similar to the automatically operable loading ramp disclosed in the Loomis et al. application, Serial No. 575,012.

In the disclosed embodiment of the invention, a warehouse, factory, or other building is designated generally by the reference character 1 and has associated therewith a loading dock 2 formed of concrete or the like and having an upper generally horizontal surface 3 and a vertical front surface 4. The dock 2 preferably is provided with a pit or recess 5 extending from the front surface 4 of the dock inwardly of the building 1 and in which is mounted a loading ramp construction designated generally by the reference character 6. The apparatus 6 may comprise a supporting framework composed of front and rear vertical elements 7 and 8, respectively, on which is supported a pair of side frame members 9 connected to one another by suitable crossbars 10 located at various points along the length of the frame members 9. At the rear of the frame members 9 is mounted a plurality of supports 11 which are spanned by a bar assembly 12 on which are mounted trunnions 13. Rockably mounted in the trunnions 13 is a shaft 14 to which is welded or otherwise suitably secured the rear end of a ramp member 15 which is capable of swinging movements about the axis of the shaft 14. The forward end of the ramp 15 extends beyond the frame member 7 and beyond the front wall 4 of the dock so as to be capable of being positioned on the load carrying bed of a truck or other vehicle located at the dock to be loaded or unloaded.

Figure 2:
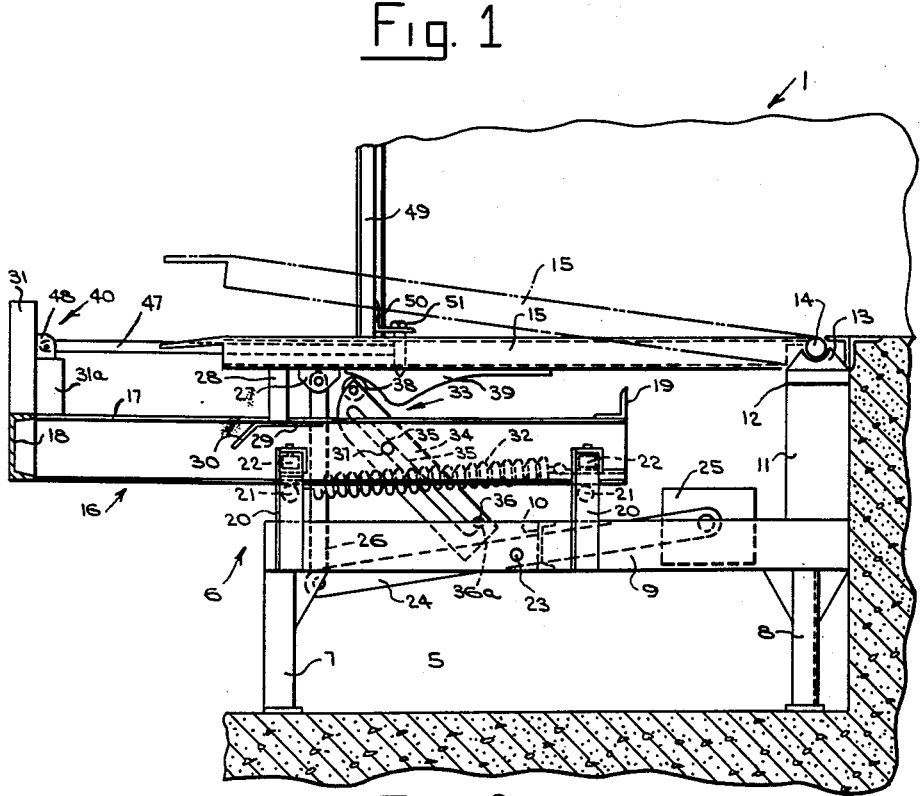
FIGURE 2 is a fragmentary, enlarged view, partly in side elevation and partly in section, of the apparatus shown in FIGURE 1.
Figure 3:
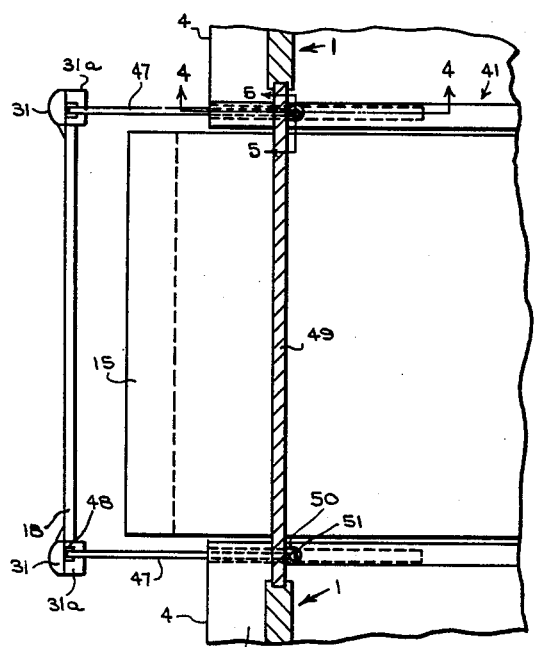
FIGURE 3 is a view partly in top plan and partly in section of the structure shown in FIGURE 2.
Figure 4:
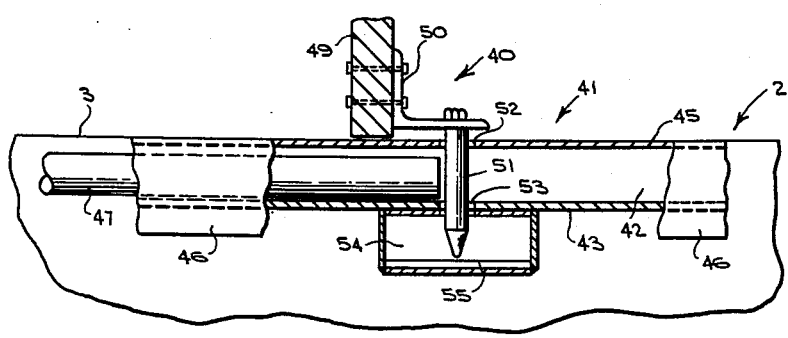
FIGURE 4 is a sectional view taken on the line 4—4 of FIGURE 3.
Figure 5:
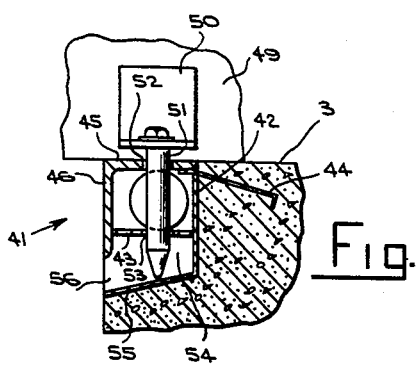
FIGURE 5 is a sectional view taken on the line 5—5 of FIGURE 3.

The loading ramp apparatus also includes a bumper frame member designated generally by the reference character 16 and comprising a substantially rectangular frame composed of parallel side channel members 17 and front and rear frame members 18 and 19, respectively. Each of the frame members 9 of the base frame includes a pair of uprights 20 on each of which is journaled a roller 21 for rotation about a horizontal axis and on which the bottom flange of the frame members 17 rest so as to enable the bumper frame to be moved forwardly and rearwardly of the ramp member 5. Preferably, the uprights 20 also journaled rollers 22 for rotation about a vertical axis, the rollers 22 being so located as to bear against the sides of the frame members 17 to guide the latter during fore and aft movements of the bumper frame member. The bumper frame normally is urged towards and maintained in its forward or projecting position, as shown in FIGURE 2, by means of springs 32 connected at corresponding ends to the frame members 17 and at their other ends to the uprights 20. Suitable means (not shown) may be provided to react between the bumper frame and the main frame to limit forward movement of the bumper frame.

Rockably mounted on a shaft 23 journaled at its ends in the main frame members 9 is a pair of counterweight levers 24 at corresponding ends of which is pivotally mounted a counterweight 25, the opposite ends of the levers 24 being pivotally connected to a pair of links 26 which also are pivoted to ears 27 secured to the lower surface of the ramp member 15. The construction and arrangement of the counterweight 25 and its associated parts are such that the ramp member 15 normally is biased by its own weight to swing downwardly, that is, in a counterclockwise direction as viewed in FIGURE 2. During periods of inactivity of the loading ramp, the ramp member 15 preferably is supported in a horizontal position and at substantially dock level so as to permit cross traffic over the ramp. In order to accomplish this objective, the ramp member 15 may be provided on its lower surface with a pair of downwardly extending foot elements 28 which are adapted to rest upon supporting bars or flanges 29 welded or otherwise suitably secured to the frame elements 17 when the bumper frame member is in its forwardly projected position as shown in FIGURE 2. If desired, the forward end of the supporting members 29 may be cammed or sloped downwardly as at 30 so that upon forward movement of the bumper frame member the elements 29 will engage the feet 28 and lift the bumper frame member to its horizontal position from a somewhat lower position.

The bumper frame member is adapted to be engaged by a truck or the like backing toward the dock so as to cause the bumper frame member to be pushed rearwardly against the force of the springs 32 from the position shown in FIGURE 2. In order to assure that trucks of varying height will engage the bumper frame member, the latter may be provided with upstanding bumpers 31 welded or otherwise rigidly secured to opposite ends of the crossbar 18. The rear faces of the bumpers 31 may be equipped with yieldable pads 31a adapted to bear against the front wall.

The apparatus includes motion or force transmission means interposed between the bumper frame member and the ramp member for swinging the latter upwardly in response to rearward movement of the bumper frame member. The force transmission means is indicated generally by the reference character 33 and may comprise a lifter arm 34 having a slot 35 therein adapted to receive a pin 36 fixed on the main frame bar 9 and which also receives a pin 37 fixed on the frame member 17 of the bumper frame member 16. When the lifter arm 34 is in the position shown in FIGURE 2, the pin 36 is received in a branch 36a of the slot 35 and the lifter arm is so positioned that a roller 38 rotatably journaled at the upper end of the lifter arm 34 is in engagement with a cam 39 welded or otherwise suitably fixed to the lower surface of the ramp member 15. The arrangement is such that rearward movement of the bumper frame 16 causes the lifter arm 34 to rock about the axis of the pin 36 and lift the ramp 15 to the position shown in chain lines in FIGURE 2, at which time the lifter arm will be in a substantially vertical position. Upon further rearward movement of the bumper frame 16, the lifter arm 34 will be shifted relatively to the pin 36 so that the lifter arm 34 drops vertically and permits the ramp 15 to swing downwardly to such position that the forward end of the ramp may rest on the load carrying bed of the vehicle. The force transmitting means 33 shown herein is similar in all respects to that shown in application Serial No. 575,012, so it is not considered necessary to describe it in further detail.

The aparatus described thus far forms no part of the invention per se. The invention resides in the provision of means for disabling rearward movement of the bumper frame 16 and upward movement of the ramp 15 when such movements are not desired. The disabling means is designated generally by the reference character 40 and preferably comprises a tubular element 41 embedded in the loading dock 2 flush with the upper surface of the latter and located at the sides of the recess or pit 5. In the disclosed embodiment of the invention the tubular element 41 comprises an angle bar having flanges 42 and 43 anchored to the dock 2 by anchor bars 44 and assembled in substantially box form with a curb angle having flanges 45 and 46 so arranged as to form a hollow passage. The bumper frame 16 has associated therewith a pair of rearwardly extending rods or bars 47 adapted to be received in the associated tabular elements 41 and the forward end of each bar 47 conveniently may be mounted on the associated upright 31 by means of an ear or similar part 48 welded to the upright.

In the disclosed embodiment of the invention, the loading ramp 6 is adapted for use in conjunction with a building having a vertically movable door 49 which, in its closed position, is adapted to rest upon the upper surface of the ramp 15 as is most clearly shown in FIGURE 2. Mounted at the lower end of the door 49 is a pair of brackets 50 and each of the brackets 50 has welded or otherwise rigidly secured thereto a downwardly projecting stop pin 51. The location of the brackets 50 and stop pins 51 on the door 49 is such that each of the pins 51 is capable of registering with and extending through openings 52 and 53 formed in the flanges 45 and 53, respectively, of the tubular elements 41 when the door is moved to its closed position. In this connection, the length of the rods 47 should be so selected that, when the bumper frame member is in its projected position, each rod 47 will terminate at its rearward end just short of the openings 52 and 53 so as to permit passage of the pins 51 through the tubular elements 41. In these conditions of the parts, therefore, rearward movement of the bumper frame 16 automatically is precluded when the door 49 is closed and, consequently, the ramp 15 is disabled from swinging upwardly and damaging the door 49 or itself.

As will be evident from the foregoing description, the openings 52 and 53 in the tubular elements 41 face upwardly, thereby making it possible for dirt and water to enter the tubular elements 41. To provide for the drainage of such matter from the elements 41, each element includes in the region of the openings 52 and 53 a chamber 54 having a sloping lower wall 55 leading to an opening 56 just below the flange 46 of the curb angle and which opening leads into the recess or pit 5 so as to permit the discharge of dirt and water from the tubular elements 41 into the pit 5. The discharge of dirt from the tubular elements is assured by the ability of the pins 51 to extend completely through the elements.

The invention has been disclosed as being embodied in a loading ramp construction installed in a pit formed in a loading dock. It will be apparent, however, that the tubular elements 41 need not necessarily be supported by a dock, but may be supported on frame members carried by the main frame of the loading ramp and located at substantially the level of the upper surface of the ramp member when the latter is in its normal horizontal position. Moreover, the door of the warehouse or other building need not necessarily be a vertically movable door to assure proper functioning of the invention. In view of the many modifications of which the invention is susceptible, the disclosed embodiment is intended to be illustrative rather than definitive of the invention. The invention is defined in the claims.

I claim:

1. In combination, a building having a doorway therein; a door movably mounted on said building for opening and closing said doorway; a ramp member extending through said doorway; means mounting said ramp member for swinging movement from a normal, substantially horizontal position to a raised position; a bumper frame member; means mounting said bumper frame member for movement rearwardly of said ramp member from a normal, projected position; means reacting between said ramp member and said bumper frame member and responsive to rearward movement of the latter from said projected position for swinging said ramp member to a raised position; a stop element carried by said bumper frame member for movement therewith; a guide member fixedly supported adjacent the path of movement of said stop element; and stop means carried by said door and so positioned thereby when said doorway is closed as to locate said stop means in the path of rearward movement of said stop element and prevent movement of said bumper frame member rearwardly from its said projected position.

2. The combination set forth in claim 1 wherein said stop element comprises an elongated rod and wherein said guide means comprises a tubular element having an opening therein to receive said stop means.

3. The combination set forth in claim 2 wherein said stop means comprises a pin adapted to extend through said opening into said tubular element.

4. The combination set forth in claim 3 wherein said tubular element has another opening therein to permit drainage thereof.

5. An adjustable loading ramp construction comprising a ramp member having a forward end and a rearward end; means hinging said ramp member at its rearward end for swinging movement of said ramp member from a normal, substantially horizontal position to a raised position; a bumper frame member; means mounting said bumper frame member for movement rearwardly of said ramp member from a normal, projected position forwardly of the forward end of said ramp member; means reacting between said ramp member and said bumper frame member and responsive to rearward movement of the latter for swinging said ramp member to a raised position; a stop element carried by said bumper frame member for movement therewith; a guide member fixedly supported adjacent the path of movement of said stop element; and a removable stop member cooperable with said guide member and supported in the path of rearward movement of said stop element for engagement therewith to prevent rearward movement of said bumper frame member from its said normal position and to prevent raising of said ramp member.

6. An adjustable loading ramp construction comprising a ramp member having a forward end and a rearward end; means hinging said ramp member at its rearward end for swinging movement of said ramp member from a normal, substantially horizontal position to a raised position; a bumper frame member; means mounting said bumper frame member for movement rearwardly of said ramp member from a normal, projected position forwardly of the forward end of said ramp member; means reacting between said ramp member and said bumper frame member and responsive to rearward movement of the latter for swinging said ramp member to a raised position; a stop element carried by said bumper frame member for movement therewith; and a removable stop member supported in the path of rearward movement of said stop element when said bumper frame member is in said normal position and for engagement with said stop element to prevent rearward movement of said bumper frame member from its said normal position and to prevent raising of said ramp member.

References Cited in the file of this patent

UNITED STATES PATENTS

| | | |
|---|---|---|
| 937,375 | Logan | Oct. 19, 1909 |
| 2,424,876 | Butler | July 29, 1947 |
| 2,494,754 | Goughnour | Jan. 17, 1950 |
| 2,501,404 | Muller | Mar. 21, 1950 |
| 2,502,181 | Stacey | Mar. 28, 1950 |
| 2,639,450 | Ramer | May 26, 1953 |
| 2,670,484 | Bintliff et al. | Mar. 2, 1954 |
| 2,924,859 | Alexander | Feb. 16, 1960 |
| 2,994,894 | Loomis et al. | Aug. 8, 1961 |